United States Patent Office 2,706,446
Patented Apr. 19, 1955

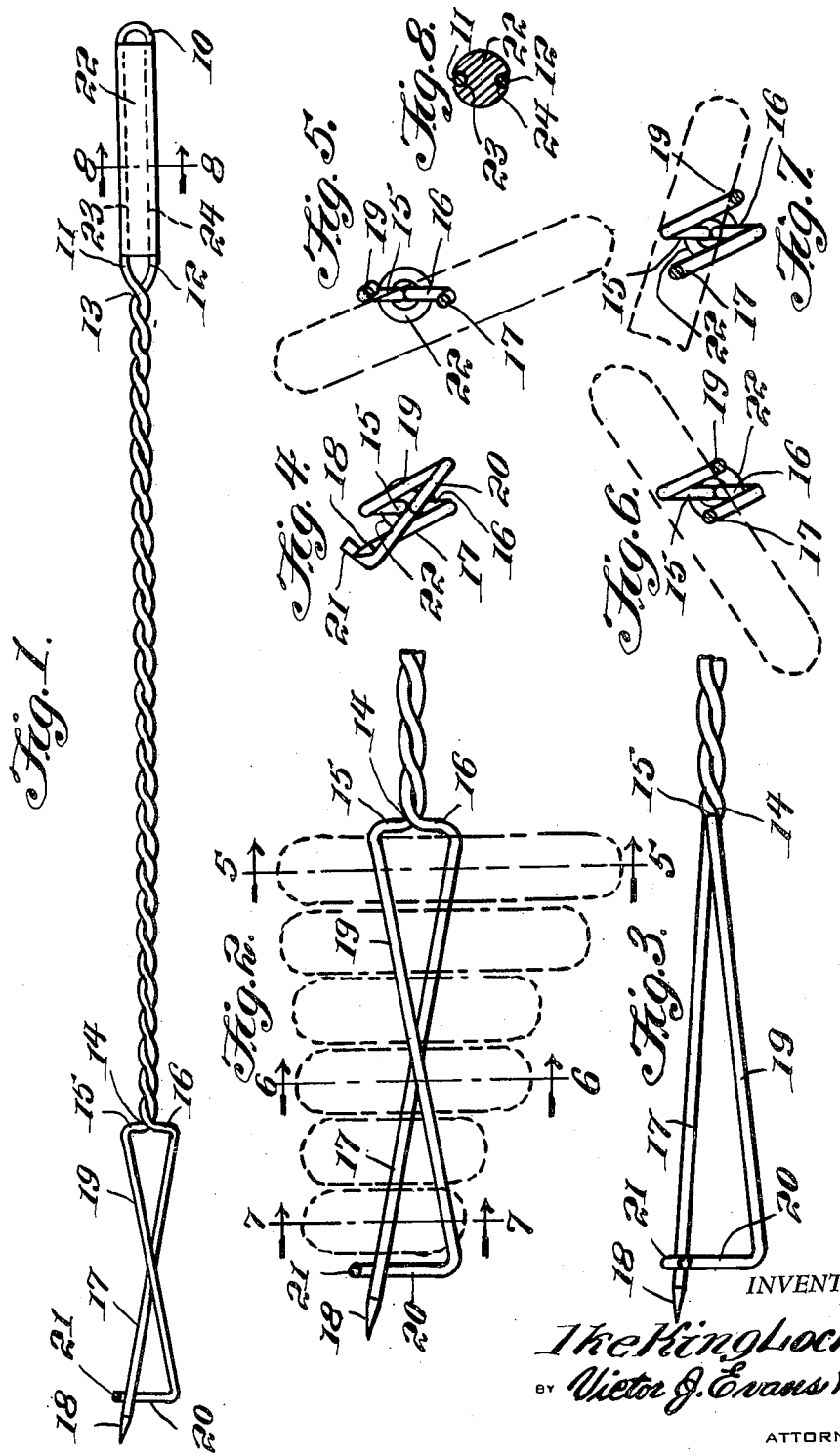

2,706,446

SKEWER

Ike King Lockey, Phenix City, Ala.

Application September 17, 1952, Serial No. 310,034

1 Claim. (Cl. 99—419)

This invention relates to metal devices for holding meat and other products in position for roasting, such as a skewer, and in particular an elongated handle formed of strands of twisted material with a gripping handle in one end and with offset spirally positioned prongs extended from the opposite end and hooked together at the extended ends for securing products and particularly link sausage in a spiral position thereon.

The purpose of this invention is to provide a roasting fork or skewer particularly adapted for roasting link sausage over the fire in which the sausages are spirally positioned whereby open space is provided continuously around each sausage link so that the heat comes in contact substantially with the entire outer surface of each link.

With the conventional type of skewer or pin where meat products are held in assembled relation for roasting abutting surfaces of the products are in contact continuously and only side surfaces of the products come in contact with the heat. With this thought in mind this invention contemplates a skewer wherein the product holding prongs are in the form of a screw thread or spiral whereby with the products positioned on one prong another prong retains the products in the position of a spiral so that comparatively small meeting areas of the products are in contact.

The object of this invention is to provide means for forming a pair of prongs extended from the end of a handle wherein meat products placed on the prongs are progressively positioned with each product in a different plane whereby meeting areas of the products are comparatively small.

Another object of the invention is to provide a skewer for retaining products in spaced relation for roasting in which the products are readily removable from the skewer.

A further object of the invention is to provide a skewer for retaining a plurality of products in spaced relation for roasting in which the skewer is of a simple and economical construction.

With these and other objects and advantages in view the invention embodies a skewer having strands twisted to form an elongated shank with a grooved gripping member positioned between the strands at one end to provide a handle and with offset prongs extended in the form of a spiral from the opposite end and having a hook extended from the end of one of the prongs and positioned to receive the end of the other prong.

Other features and advantages of the invention will appear from the following description taken in connection with the drawing, wherein:

Figure 1 is a side elevational view illustrating the improved skewer or roasting fork.

Figure 2 is a view similar to that shown in Figure 1 showing the prongs of the device on an enlarged scale and showing link sausage progressively positioned thereon, the sausage being shown in dotted lines.

Figure 3 is a similar detail looking towards one side of the device.

Figure 4 is an end elevational view looking toward the extended ends of the prongs and showing in particular the hook with which the extended ends of the prongs are held together.

Figure 5 is a cross section through the material holding portion of the device taken on line 5—5 of Figure 2 and illustrating the position of the first unit of material placed on the device.

Figure 6 is a section similar to that shown in Figure 5 taken on line 6—6 of Figure 2 showing the position of one of the following units of material positioned on the device.

Figure 7 is a section also similar to that shown in Figures 5 and 6 taken on line 7—7 of Figure 2 also illustrating the position of one of the following units.

Figure 8 is a cross section through the handle being taken on line 8—8 of Figure 1.

Referring now to the drawing wherein like reference characters denote corresponding parts the improved skewer or link sausage roasting fork of this invention includes a continuous strand of material, such as comparatively heavy wire, bent at the point 10 to form a loop with side members 11 and 12 and twisted from the point 13 to a point 14 providing an elongated shank or handle, extended laterally from the point 14 providing sections 15 and 16 and, from the ends of the sections 15 and 16 the members or strands extend in the form of a spiral providing a prong 17 having a point 18 on the extended end and a co-acting prong or body member 19 having a section or transverse portion 20 extended across the center and having a hook 21 on the extended end, the hook being positioned to receive the end of the prong 17.

A gripping member 22 having grooves 23 and 24 in opposite sides is positioned in the loop formed at the end of the shank and the side members 11 and 12 are positioned in the grooves, as shown in Figures 1 and 8.

The prongs 17 and 19 are so shaped that link sausage or other material positioned on the prong 17 is held by the prong 19 so that the units are progressively positioned with each succeeding unit being turned slightly in relation to the former unit wherein the contact area between the units is reduced to a minimum. With one unit, such as a link of sausage positioned on the prong 17 in an upwardly extended position as illustrated in Figure 5, the next unit is twisted in a clockwise direction with the following units similarly positioned as illustrated in Figures 6 and 7. The units are held in progressive positions by the strand or prong 19, also as illustrated in Figures 4, 5, 6 and 7.

With link sausage or other products retained on the skewer or roasting fork in this manner each unit is subjected to heat from a fire over substantially the continuous area thereof.

Although the device is disclosed and described as being particularly adapted for holding link sausage it will be understood that it is adapted for use in roasting or holding other products.

It will be understood that modifications, within the scope of the appended claim, may be made in the design and arrangement of the parts without departing from the spirit of the invention.

What is claimed is:

In a skewer, a continuous strand of material bent to form a loop, said loop including a pair of spaced parallel side members, a shank extending from said loop and including twisted portions, a first and second section extending outwardly from an end of said shank, and said first and second sections being arranged in end to end relation with respect to each other, a straight prong extending angularly from said first section and terminating in a pointed tip, a body member extending angularly from said second section and including a major straight portion, a transverse portion extending angularly from the outer end of said body member, said transverse portion terminating in hook for receiving the end of said prong, said body member being spaced from said prong and arranged in angular relationship therewith.

References Cited in the file of this patent

UNITED STATES PATENTS

| | | |
|---|---|---|
| 624,387 | Shedenhelm | May 2, 1899 |
| 1,192,898 | Houston | Aug. 1, 1916 |
| 2,276,194 | Hochreiner | Mar. 10, 1942 |
| 2,479,324 | Dawson | Aug. 16, 1949 |